Feb. 15, 1938.    O. J. PRUCHA    2,108,295
UNIVERSAL EASEL TABLE
Filed March 25, 1935    2 Sheets-Sheet 1
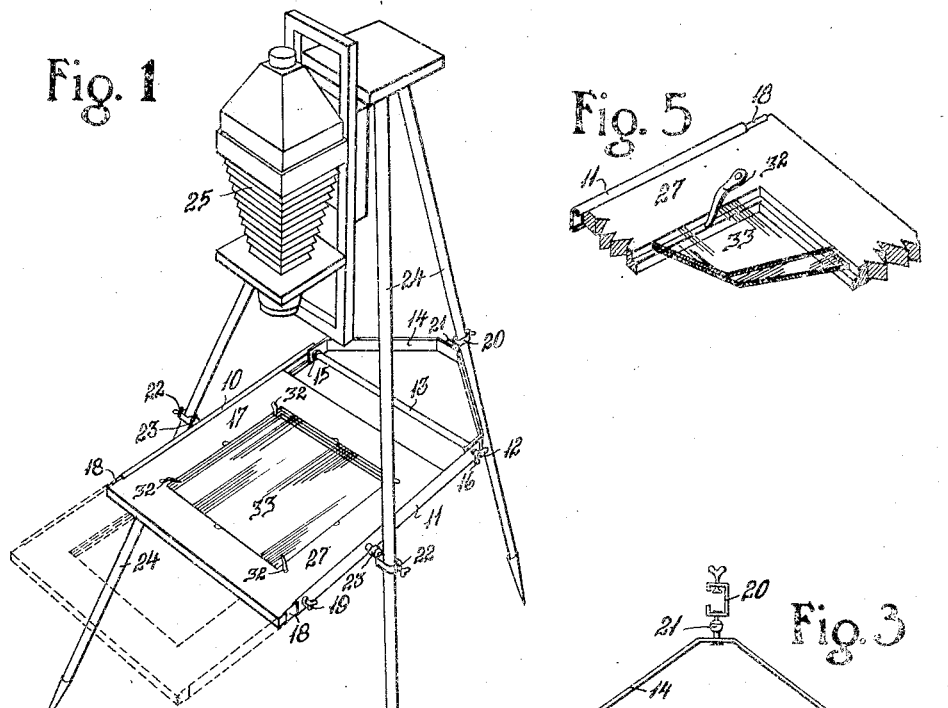
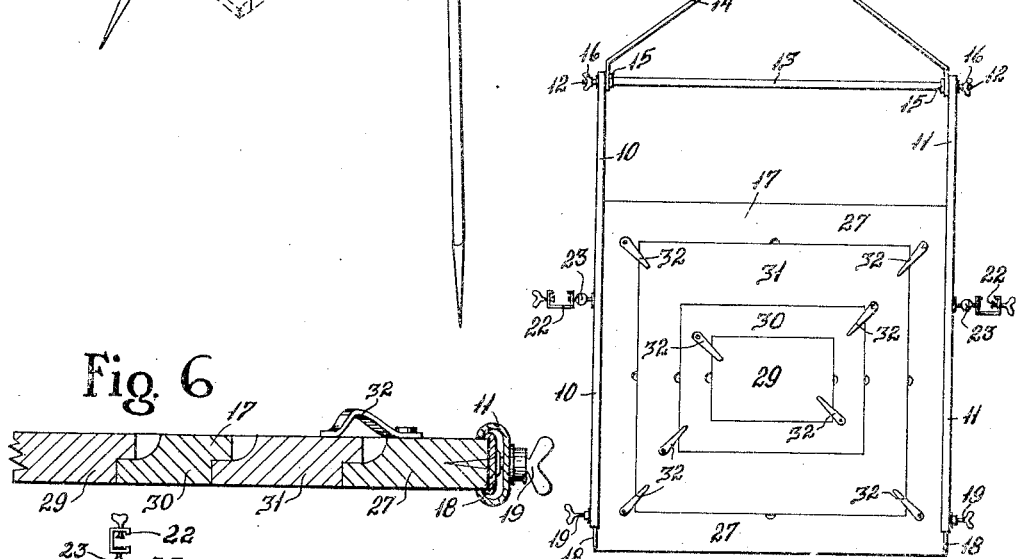
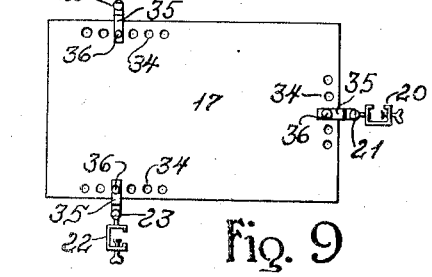
Inventor
Otto J. Prucha
Homer S. Sweet
By
Attorney Feb. 15, 1938.  O. J. PRUCHA  2,108,295
UNIVERSAL EASEL TABLE
Filed March 25, 1935   2 Sheets-Sheet 2
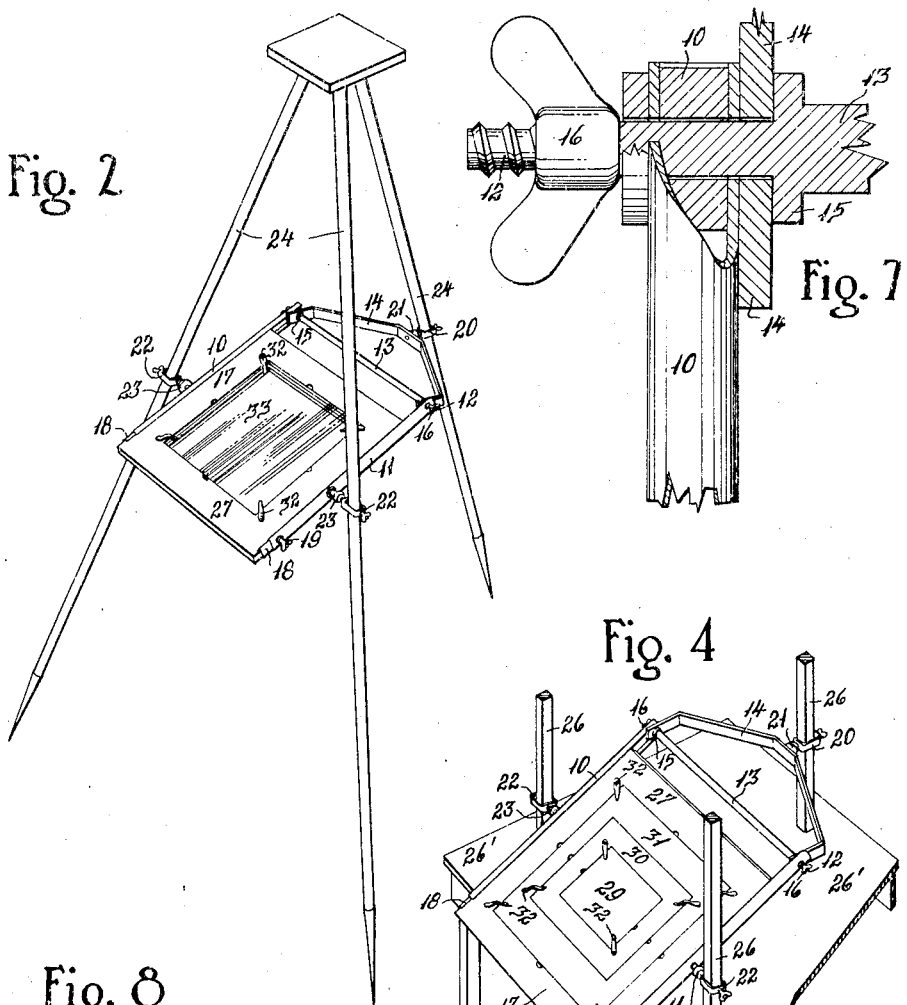
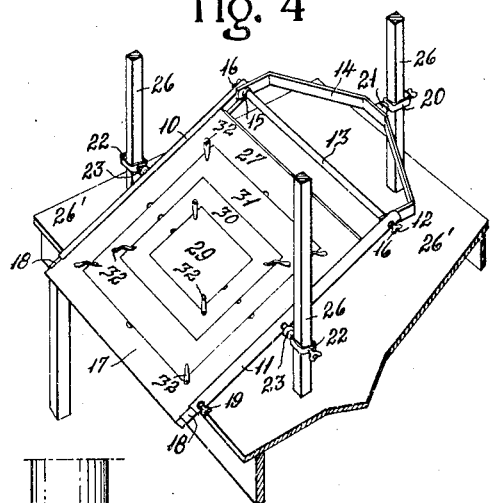
Inventor
Otto J. Prucha
Homer G. Sweet
By
Attorney Patented Feb. 15, 1938

2,108,295

UNITED STATES PATENT OFFICE 2,108,295

UNIVERSAL EASEL TABLE

Otto J. Prucha, Denver, Colo.

Application March 25, 1935, Serial No. 12,891

6 Claims. (Cl. 248—1)

This invention relates to adjustable devices adapted for employment by artists, photographers, and the like, and has as an object to provide an improved table construction specifically adaptable in a variety of installations to readily meet the needs and facilitate the work of the user.

A further object of the invention is to provide an improved construction of adjustable table readily adaptable to a wide variety of specific uses.

A further object of the invention is to provide an improved construction of adjustable table arranged to combine in a single unit the functional advantages of several separate devices now conventionally employed.

A further object of the invention is to provide an improved operative combination of an adjustable table adapted for use with a camera tripod support.

A further object of the invention is to provide an improved universally adjustable table operatively combinable with a camera tripod support.

A further object of the invention is to provide an improved construction of adjustable table that is relatively simple and inexpensive of manufacture, arranged for either field or laboratory use, adjustable throughout a wide range of positions, and adaptable to substantially every use wherein a supporting panel is required.

My invention consists in the construction, arrangement and combination of elements hereinafter set forth, pointed out in my claims and illustrated by the accompanying drawings, in which—

Figure 1 is a perspective view of a preferred form of the improvement as mounted on a conventional tripod for cooperation with a camera supported by said tripod. Figure 2 is a perspective view similar to Figure 1, illustrating an adjusted position of the improvement. Figure 3 is a top plan view of the preferred form of the improved table assembled for practical use prior to being mounted on a support. Figure 4 is a perspective view of the preferred form of the improved table mounted for use on a suitably arranged table support. Figure 5 is a fragmentary, detail perspective, on an enlarged scale, illustrating specific construction and use of the improvement. Figure 6 is a fragmentary, detail section, on an enlarged scale, illustrating construction and arrangement of elements employed in the improvement. Figure 7 is a fragmentary, detail view, partly in section and on an enlarged scale, illustrating a clampable hinge joint employed in the improvement. Figure 8 is a fragmentary, detail view, on an enlarged scale, illustrating a construction and arrangement of supporting clamp employed with the improvement. Figure 9 is a conventionalized plan view of a simplified form and construction wherein the improvement might be given effect.

In the construction of the improvement as shown, a table frame is illustrated as comprising identical side members 10 and 11 arranged in spaced, parallel opposition to receive and support the table panel proper. The frame members 10 and 11 may be of any material and construction suitable to the purposes hereinafter set forth and are shown as straight, rigid bars channeled or otherwise formed to approximately C-shape to provide long slide bearings. Corresponding ends of the members 10 and 11 are provided with registering apertures to receive the threaded opposite ends 12 of a shaft 13. A yoke 14, substantially V-shaped in plan, is formed with its divergent ends in parallel, spaced relation, and holes are formed in the parallel ends of the yoke 14 to receive the threaded ends 12 of the shaft 13, whereby said yoke is mounted on and in hinged relation with said shaft. Suitable collars 15 are formed on or fixed to the shaft 13 adjacent its ends 12 to engage against the yoke ends or members 10 and 11 to limit travel thereof along the shaft 13, thereby acting as spacers to maintain the desired spread of the yoke 14 and a predetermined spacing between the members 10 and 11. Wing-nuts 16 threadedly engage the ends 12 of the shaft 13 and bear against the outer sides of the assemblies carried by said shaft ends, thereby serving to clamp the elements of such assemblies firmly together and against the collars 15. A panel unit, designated generally by the numeral 17, having a width equal to the spacing between the members 10 and 11 determined by their mounting on the shaft 13, is provided with suitable slide members 18 disposed in fixed relation along its opposite side margins, said members 18 being adapted to telescope within and slide freely relative to the frame members 10 and 11. While the members 18 are shown as separate strips secured to the board 17, it is to be understood that the illustrative showing is but typical and that many other constructions operable to the same end are possible and may, in fact, be preferable. The panel unit 17 is mounted between and for travel longitudinally of the frame members 10 and 11 by sliding engagement of its side members 18 within the channels provided for that purpose in the frame members 10 and 11, said board, thus engaged, serving to space and preserve the alignment of the otherwise free ends of the members 10 and 11. Clamp screws 19 are operatively mounted on and engaged through the ends of the members 10 and 11 remote from the shaft 13, and said clamp screws are arranged to bear against the side members 18 of the unit 17 and clamp the latter in its desired position longitudinally of the members 10 and 11. A suitable side-opening clamp 20 is connected by means of a suitable ball-joint or swivel 21 to the apex of the yoke 14, and similar clamps 22 are secured by means of ball-joints or swivels 23 to the outer walls of and substantially midway along the frame members 10 and 11, which clamps 20 and 22 provide a three-point mounting for the frame and panel unit of the improvement.

As shown in Figure 1, the yoke 14 may be clamped by means of the wing-nuts 16 to lie in the same plane with the members 10 and 11, and the clamps 20 and 22 then secured to the legs of a conventional tripod 24 to position the panel unit 17 horizontally between the tripod legs where it is readily adjustable longitudinally of its supporting frame when the clamp screws 19 are loosened, such adjustment being indicated by dotted lines in the said figure. Positioned as just described, the panel unit 17 is available for cooperation with a camera 25 supported in vertical position by the tripod 24, which cooperation is of great advantage in projecting, enlarging, reducing, copying and photographing as now commonly practiced. The distance between the camera lens and panel unit 17 can be readily adjusted by moving of the clamps 20 and 22 along the tripod legs, the longitudinal adjustment of said unit in its supporting frame permitting of centering of said unit relative to the camera lens. The hinge joint provided by the shaft 13 and wing-nuts 16 permits tilting of the panel unit out of the horizontal when such adjustment is desired for any purpose, as may be desirable in the rectifying of negatives or pictures, and lateral inclination of the unit 17 may readily be had by moving one or the other of the clamps 22 along its tripod leg, all of which is clearly indicated in Figure 2. When mounted on a tripod, the improvement serves as a very substantial and rigid brace for the tripod legs and prevents slipping or accidental displacement of such legs when mounted on hard and slippery surfaces.

As indicated by Figure 4, the improvement may be clamped to suitable risers 26 fixed to and extending upwardly from a table or bench 26', in which mounting the improvement is susceptible of all the adjustments previously described and is available for a multiplicity of specific uses in the laboratory. It is of course obvious that the showing of Figure 4 is but indicative of many possible mountings, since the risers 26 may project from a floor, depend from a ceiling, or be carried by wall brackets, with the same function and effect they possess in the illustration.

The panel unit 17 may be of any suitable, preferred construction, and is illustrated as comprising a rigid, frame-like, rectangular member 27 wherein panels and various-sized frames 29, 30 and 31 are nested and removably held by means of spring fingers 32, as is common practice. The various nested elements of the panel unit 17 shown in Figure 3 cooperate to provide a smooth, solid undersurface, which smooth surface is available for use by merely reversing the panel unit in its frame mounting. As shown in Figures 1, 2 and 5, the nested frames and panel may be removed from the outer frame 27 and glass plates 33 substituted therefor, which plates may have any desired finish, color, and degree of transparency, and may be variously employed to support negatives, objects and designs to be copied, and the like, and simultaneously serve to transmit light to or through the object supported thereby. When the improvement is mounted as shown in Figure 4, and the glass plates 33 are positioned in the panel unit 17, the assembly is available for use as a copying or retouching desk with a proper arrangement of lights, and can also be used as a printing frame when a suitable light is positioned in proper relation behind the glass plates 33.

In Figure 9 of the drawings is illustrated a simplified form of the invention corresponding exactly in principle with and possessing most of the advantages of the construction hereabove described. In the illustration of the modification, the panel unit 17 is shown as of unitary panel construction, preferably rectangular in plan, and provided with rows of spaced holes 34 suitably positioned in adjacent parallelism with the long margins and one end margin of said panel. To position and adjustably support the unit 17 of the modification on and relative to a tripod, or other mount, the clamp elements 20 and 22, with their respective swivels 21 and 23, are employed, said clamp elements used with the modification being provided with U-shaped yokes 35 in fixed relation with one of the elements of each of the swivels 21 and 23, which yokes 35 are arranged to clip in embracing relation over margins of the unit 17 and extend across a given line of holes 34, the open ends of the said yokes 35 being provided with registering holes positioned to register with a selected hole 34 so that a pin 36 may be inserted through said holes when in registration to adjustably interconnect the clamp assemblies with the panel unit. With the modified construction just described, the clamp elements may be variously adjusted relative to the unit 17 and likewise variously adjusted in their engaging relation with mount or support elements, thus providing a wide range of possible adjustment for the said panel unit.

While no attempt has been made to list all the possible uses and advantages of the improvement, it should be readily apparent that the adjustable table is well adapted to replace many items of conventional equipment and presents, in addition, certain advantages of function and operation not now found in equipment generally in use.

Since many changes and modifications in the specific form, construction and arrangement of the elements set forth may be had without departing from the spirit of the invention, I wish to be understood as being limited solely by the scope of the appended claims, rather than by any details of the illustrative showing and foregoing description.

I claim as my invention—

1. An adjustable table comprising a frame formed with spaced, parallel bars interconnected at one end to form a slide bearing, a terminal yoke hinged to and extending longitudinally beyond the interconnected ends of said bars, means on said bars adapted to receive and slidably support a panel unit, a panel engaged between said bars, and separate means carried by said bars and said yoke whereby the assembly may be removably secured to a suitable support.

2. An adjustable table comprising a pair of channeled bars arranged in spaced, parallel opposition with corresponding ends interconnected to form a U-shaped frame adapted to receive and slidably support a panel unit, a panel slidably engaged between said channeled bars, a terminal yoke hinged to and extending longitudinally beyond the closed end of said frame, clamp means carried by said frame and engaging said yoke and operable to position the latter in the desired angular relation with the former, and separate means carried by each of said bars and by said yoke whereby the assembly may be removably secured to a suitable support.

3. An adjustable table comprising a U-shaped frame adapted to receive and slidably support a panel unit, a panel slidably engaged in said frame, a yoke hinged to and extending longitudinally beyond the closed end of said frame, means carried by said frame and engaging said yoke whereby the latter may be clamped in the desired angular relation with the former, and separate means swiveled to each leg of said frame and to said yoke whereby the assembly may be removably secured to suitable supports.

4. An adjustable table comprising a U-shaped frame adapted to receive and slidably support a panel unit, a panel slidably engaged in said frame, a terminal extension in hinged cooperation with and extending longitudinally beyond the closed end of said frame, means operable to clamp said extension in the desired angular relation with said frame, and independent clamp elements swiveled to the parallel legs of said frame and to said terminal extension whereby the assembly may be removably secured to suitable, spaced supports.

5. In an adjustable table of the character described, a U-shaped frame adapted to receive and slidably support a panel unit, a terminal extension in hinged cooperation with the closed end of said frame, and separate clamp means carried by said frame and by said extension whereby the assembly may be removably secured to and adjustably positioned on suitable spaced supports.

6. In an adjustable table of the character described, a U-shaped frame adapted to receive and slidably support a panel unit, a terminal extension in hinged cooperation with the closed end of said frame, means operable to clamp said extension in the desired angular relation with said frame, and a clamp swiveled to each of the parallel legs of said frame and to said extension whereby the assembly may be removably secured to and mounted between suitable spaced supports.

OTTO J. PRUCHA.